United States Patent [19]

Kawazoe

[11] 4,048,488
[45] Sept. 13, 1977

[54] COUPLING DEVICE IN A STROBOSCOPE HOLDER WITH A REMOVABLE BRACKET

[76] Inventor: Michio Kawazoe, 30-11 5 chome, Narita Higashi, Suginami, Tokyo, Japan

[21] Appl. No.: 629,714

[22] Filed: Nov. 7, 1975

[30] Foreign Application Priority Data

June 23, 1975 Japan .................................. 50-86807

[51] Int. Cl.² ............................................. G30B 17/56
[52] U.S. Cl. .................................... 240/1.3; 240/52.1; 403/322; 403/327
[58] Field of Search ............... 403/322, 325, 324, 321, 403/327; 24/230 AC, 230 AL; 240/1.3, 52.1; 354/126, 293; 279/76, 86, 97

[56] References Cited

U.S. PATENT DOCUMENTS

| 1,460,082 | 6/1923 | Sphar | 403/325 |
| 3,104,477 | 9/1963 | Edwill | 403/328 X |
| 3,852,788 | 12/1974 | Ueda | 354/126 X |

FOREIGN PATENT DOCUMENTS

| 87,516 | 7/1966 | France | 24/230 AL |

Primary Examiner—Andrew V. Kundrat
Attorney, Agent, or Firm—D. Gordon Angus; Donald D. Mon

[57] ABSTRACT

A coupling device comprises a retainer including a spring-loaded joint bar with a push rod perpendicular thereto, and an insertion including a solid body having a recess and a guide slope.

The retainer is attached to a stroboscope holder, while the insertion is attached to a bracket.

The insertion is easily and quickly connected with the retainer by inserting the solid body into the retainer.

By a force which the joint bar receives from the solid body, the joint bar is caused to slide against a force of a spring along a guide slope until the joint bar falls in a recess, and the joint bar is engaged with the recess.

On the other hand, the insertion is removed easily and quickly from the retainer merely by pushing the push rod until the engagement of the joint bar with the recess is released, and then pulling out the insertion from the retainer.

3 Claims, 6 Drawing Figures

COUPLING DEVICE IN A STROBOSCOPE HOLDER WITH A REMOVABLE BRACKET

BACKGROUND OF THE INVENTION

This invention relates to a coupling device in a stroboscope holder with a removable bracket, and more particularly concerns a coupling device by which a bracket can easily and quickly be attached to a stroboscope holder, and the former can easily and quickly be detached from the latter.

Conventionally, a stroboscope is fixedly attached with a bracket.

In general, when a photograph is taken with a stroboscope, a camera is mounted on a bracket, and a stroboscope is linked to a camera shutter. The release of the camera shutter synchronized with flashing, enable a photograph to be taken.

In such a manner, when a photograph is taken with a stroboscope held together with a camera, a stroboscope holder with a bracket is very useful as a means for holding the camera and stroboscope together.

But in case a photograph is to be taken with the stroboscope and placed apart, from each other, a stroboscope holder held by the bracket to the camera is inconvenient.

Brief Summary of the Invention

It is an object of the invention to provide a coupling device in a stroboscope holder with a bracket whereby the bracket can be, easily and quickly, attached to a stroboscope holder and detached therefrom.

These and other objects of the invention will become more apparent in the detailed description and example which follow.

Figure 1:
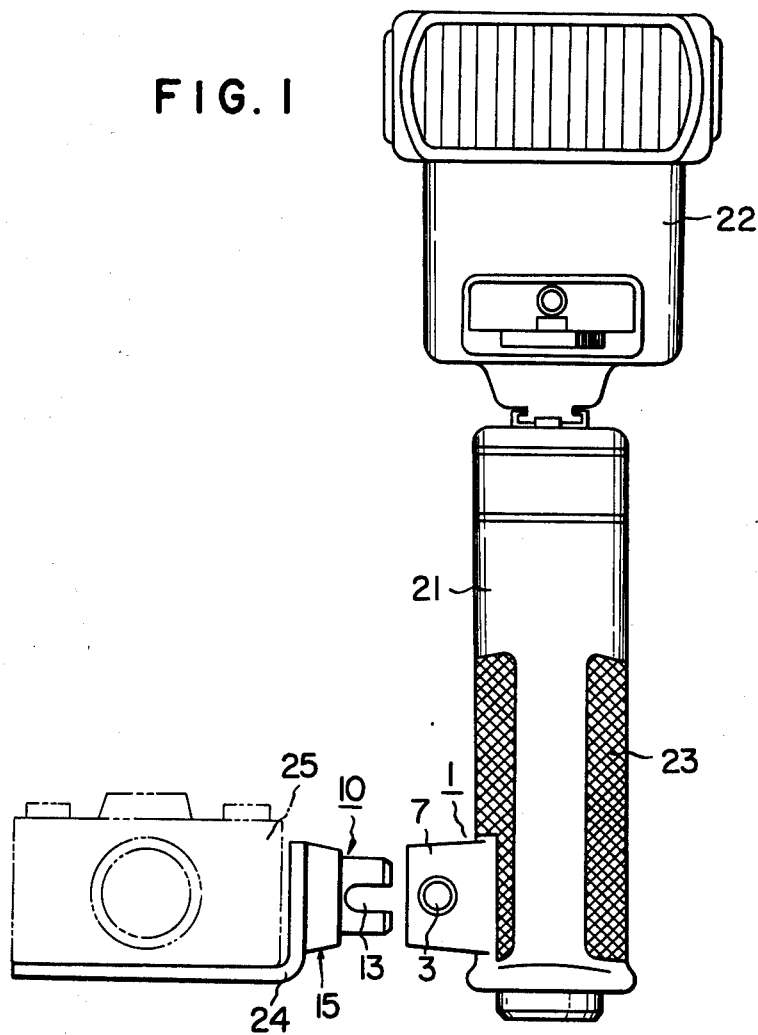
FIG. 1 is an elevational view of a coupling device according to the invention with a stroboscope, a holder therefore and a bracket.
Figure 2:
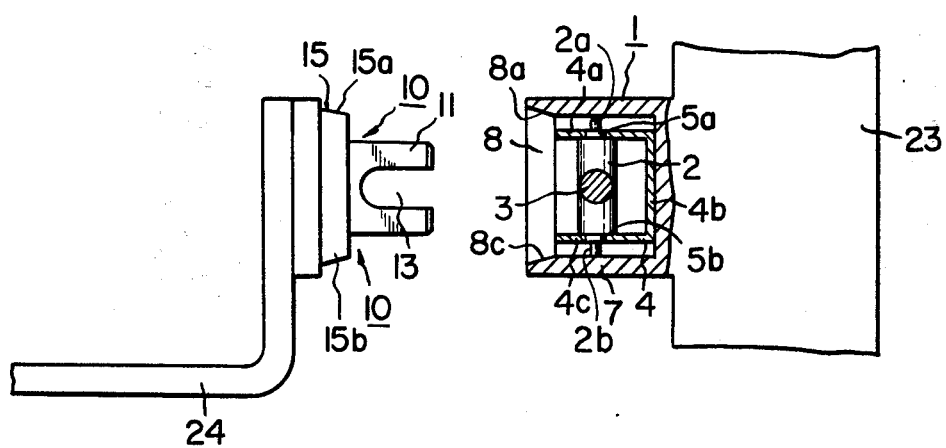
FIG. 2 is an elevational view, partly in section, of the coupling device in FIG. 1.

Referring first to the embodiment of the invention shown in FIGS. 1 - 4 inclusive, the coupling device comprises a retainer 1 and an insertion 10.

The retainer 1 is attached to a handle 23 of a stroboscope holder 21 supporting a stroboscope 22, while the insertion is attached to a bracket 24 supporting a camera 25.

The retainer 1 includes a joint bar 2 with a push rod 3, a guide plate 4 with a pair of slots 5a and 5b, a spring 6, and a box 7. The push rod 3 is attached perpendicularly to the joint bar 2, and it acts as a means of moving the joint bar 2. The guide plate 4 has a channel section consisting of top part 4a, side part 4b, and bottom part 4c. In the top part 4a and bottom part 4c, there are a pair of slots 5a and 5b extend with their longer dimension parallel with the side part 4b of the guide plate 4.

One end 2a of the joint bar 2 is inserted into the slot 5a, while another end 2b thereof into the slot 5b, and the joint bar 2 engages with the slots 5a and 5b in such a manner that the joint bar 2 is supported by the guide plate 4. The spring 6 has one end fixed at an area outside an extremity of the slot 5a in the top part 4a and the other end attached to the joint bar 2. The box 7 has an opening 8, through which the insertion 10 is inserted into the retainer 1. Four internal sides 8a, 8b, 8c and 8d in the opening 8 as tapered so that the insertion 10 can be easily taken out and in. In the box 7, the guide plate 4 is mounted with the joint bar 2 and the spring 6. Reference numeral 9 indicates a snap ring for preventing the push rod 3 from coming out of box 7.

The insertion 10 includes a solid body 11 having a recess 12, a channel 13, and a guide slope 14. The recess 12 engages with the joint bar 2. The joint bar 2 falls into the recess 12, whereby the insertion 10 is locked into the retainer 1. The channel 13 makes the passage of the push rod 3 possible. The guide slope 14 is shaped so that the joint bar 2 can be conducted into the recess 12. The solid body 11 is mounted on a support 15. Four external sides 15a, 15b, 15c and 15d of the support 15 have slopes engaging those of the respective internal sides 8a, 8b, 8c and 8d in the opening 8 of the retainer 1.

By means of the coupling device according to the present invention, the bracket can be, easily and quickly, attached to the stroboscope holder, and removed therefrom, as follows.

In order to attach the bracket 24 to the handle 23 of the stroboscope holder 21, the solid body 11 is inserted through the opening 8 into the box 7 so as to load the joint bar 2. By reason of the force which the joint bar 2 receives from the solid body 11, the joint bar 2 is caused to slide against the tension force of the spring 6 toward the reverse in FIG. 4 (that is in the direction from the right side of the drawing to the back side), or upward in in FIG. 3 in the direction of the arrow "A") along the guide slope 14, until the joint bar 2 falls into the recess 12. Inasmuch, as the push rod 3 moves into the channel 13, the presence of the push rod 3 does not hinder the operation of connecting the retainer 1 with the insertion 10.

Figure 3:
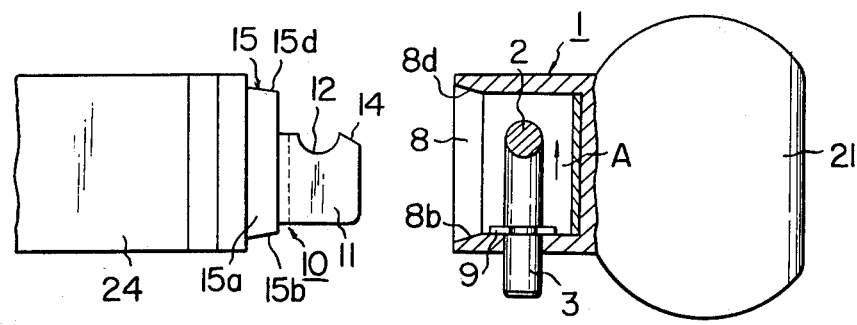
FIG. 3 is a top plan view, partly in section, of the coupling device of FIG. 2.
Figure 4:
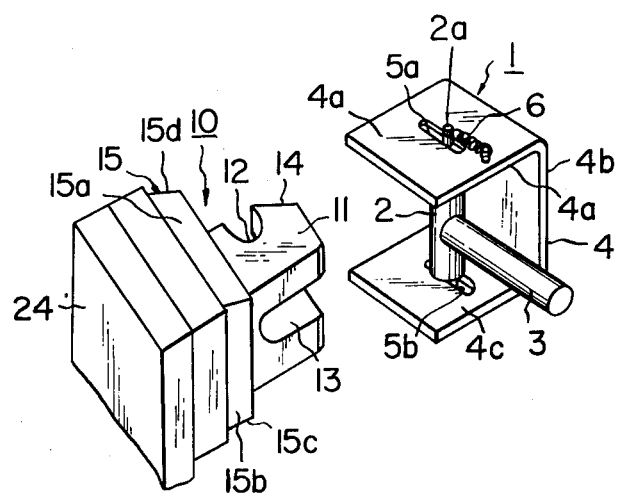
FIG. 4 is a perspective view of the coupling device of FIGS. 2 and 3.

On the other hand, in order to remove the bracket 24 from the handle 23 of the stroboscope holder 24, a force is in FIG. 3 direction of the arrow "A"), until the engagement of the joint bar 2 with the recess 12 is released. After the engagement of the joint bar with recess 12 is released, the insertion can freely be pulled out from the retainer, so that the bracket 24 can be removed from the handle 23 of the stroboscope holder 21.

Figure 5:
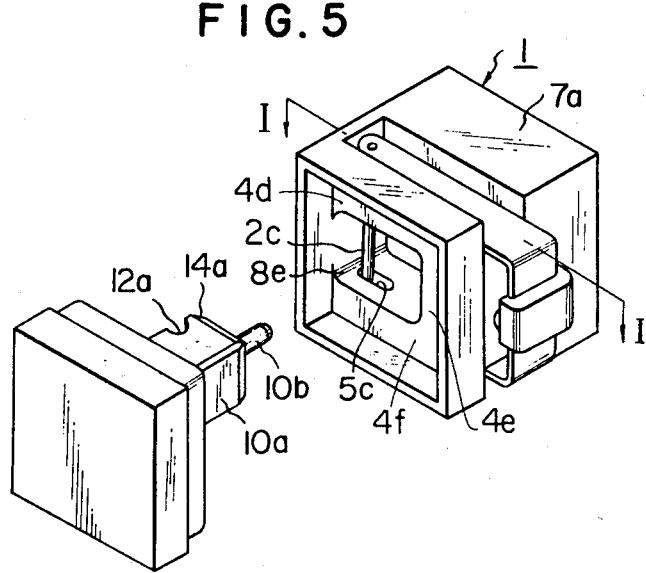
FIG. 5 is a perspective view of another embodiment of a coupling device according to the present invention.
Figure 6:
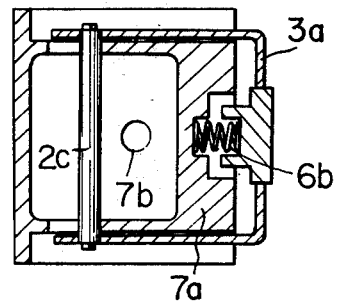
FIG. 6 is a cross section at line I—I in FIG. 5.

FIGS. 5 and 6 show an another embodiment of the present invention. In this embodiment, push rod 3a is in the form of a U shape and is biased outwardly by spring 6b inserted between that is, to the right in FIG. 6 the part of push rod 3a and box 7a. Box 7a has an opening 8e into it at which there is formed a guide plate comprising top, side and bottom parts, 4d, 4e and 4f, respectively. Insertion 10a has a centerpin 10b which is to engage the centerhole 7b of box 7a. Joint bar 2c which is to engage the recess 12a of insertion 10a, is fixed at both its ends to the sides of a shaped push slots rod 3a and extends. between these sides through a pair of 5c at the top and bottom parts of said guide inside plate the opening 8e of box 7a.

As many apparently widely different embodiments of this invention may occur without departing from the spirit and scope thereof, it is to be understood that the invention is not limited to the specific embodiments thereof excepts as defined in the appended claim.

What is claimed is:

1. In a stroboscope holder with a removable bracket wherein the bracket is attached to the stroboscope holder through a coupling device, said coupling device comprising:

a. retainer including
  a joint bar with a push rod perpendicular thereto,
  a guide plate with a channel section comprising top, side, and bottom parts,
  a pair of slots in the top and bottom parts of said guide plate carrying said joint bar, said slots extending with their longer dimension parallel with the side part of said guide plate and engaging said joint bar near both its ends,
  a spring with one end fixed at an area outside an extremity of said slot in the top part of said guide plate and the other end attached to said joint bar, and
  a box with an opening therein, said guide plate being mounted with the side part of said guide plate plate fixed on a bottom thereof,
  said retainer being mounted on the stroboscope holder; and b. an insertion mounted on the bracket, said insertion comprising:
  a solid body having a recess adapted to receive said joint bar, a guide slope in front of, and in communication with, said recess, for guiding said joint bar into said recess, and a channel for permitting the passage of said push rod into the solid body as the joint bar moves into the recess, and whereby by inserting said insertion into said retainer, the bracket can be easily and quickly attached to the stroboscope holder in one motion, and by pushing said push rod and at the same time pulling out said insertion from said retainer, the bracket can be easily and quickly removed from the stroboscope holder.

2. In a stroboscope holder with a removable bracket wherein the bracket is attached to the stroboscope holder through a coupling device, said coupling device comprising:

a. a retainer including
  a joint bar,
  push rod means attached to the joint bar and movable in a path perpendicular to the length of the joint bar;
  a guide plate with a channel section comprising top, side, and bottom parts,
  a pair of slots in the top and bottom parts of said guide plate carrying said joint bar, said slots having their longer dimension extending in the same direction as said path of movement and engaging said joint bar near both its ends,
  a spring with one engaging an area of the exterior of the guide plate and the other end positioned to bias the joint bar, and
  a box with an opening therein, said guide plate being positioned with the side part of said guide plate fixed, to an inner wall of said box within said opening,
  said retainer being mounted on the stroboscope holder; and b. insertion mounted on the bracket, said insertion comprising:
  a solid body having a recess adapted to receive said joint bar, a guide slope in front of, and in communication with said recess, for guiding said joint bar into said recess, whereby by inserting said insertion into said retainer the bracket can be easily and quickly attached to the stroboscope holder in one motion and by pushing said push rod and at the same time pulling out said insertion from said retainer, the bracket can be easily and quickly removed from the stroboscope holder.

3. Apparatus according to claim 2 in which the push rod means is U-shaped and the ends of the joint bar attach to the sides of the U of said U-shaped bar, and said other end of the spring engages the base of said U.

* * * * *